United States Patent [19]
Svennesson et al.

[11] Patent Number: 6,005,845
[45] Date of Patent: Dec. 21, 1999

[54] SYSTEM AND METHOD FOR IP-ACTIVATED CALL SETUP

[75] Inventors: Björn Arne Svennesson, Danderyd; Bo Arne Valdemar Åström, Hägersten; Gulamabbas Sumar, Kista, all of Sweden; Robert Johannes Bernardus Schmersel, Brunssum, Netherlands

[73] Assignee: Telefonaktiebolaget L/M Ericsson (publ), Stockholm, Sweden

[21] Appl. No.: 08/725,431

[22] Filed: Oct. 3, 1996

[51] Int. Cl.⁶ .................................................... H04M 3/50
[52] U.S. Cl. .......................... 370/260; 379/202; 379/205; 370/261
[58] Field of Search .................................. 370/260, 261, 370/263, 428, 522, 524, 526; 379/202, 205, 206, 207

[56] References Cited

U.S. PATENT DOCUMENTS

| | | | |
|---|---|---|---|
| 5,008,926 | 4/1991 | Misholi | 379/89 |
| 5,222,120 | 6/1993 | McLeod et al. | 379/202 |
| 5,408,518 | 4/1995 | Yunoki | 379/202 |
| 5,479,495 | 12/1995 | Blumhardt | 379/207 |
| 5,483,587 | 1/1996 | Hogan et al. | 379/202 |
| 5,526,415 | 6/1996 | Wakamoto | 379/202 |
| 5,546,449 | 8/1996 | Hogan et al. | 379/202 |
| 5,559,876 | 9/1996 | Alperovich | 379/205 |
| 5,590,186 | 12/1996 | Liao et al. | 379/202 |
| 5,631,904 | 5/1997 | Fitser et al. | 379/205 |
| 5,661,790 | 8/1997 | Hsu | 379/209 |

FOREIGN PATENT DOCUMENTS

| | | |
|---|---|---|
| 2216171 | 12/1994 | Canada . |
| 0 662 763 A2 | 7/1994 | European Pat. Off. . |
| 0 631 452 A1 | 12/1994 | European Pat. Off. . |
| 0 699 009 A1 | 2/1996 | European Pat. Off. . |
| 0 714 214 A2 | 5/1996 | European Pat. Off. . |
| WO 87/07801 | 12/1987 | WIPO . |
| WO 95/20857 | 8/1995 | WIPO . |

OTHER PUBLICATIONS

L. Dittrich, P. Holzner and M. Krumpe, *Implementation of the GSM–Data–Services Into the Mobile Radio System*, 11312 MRC Mobile Radio Conference, Nice, France, Nov. 13–15, 1991, pp.73–83.

Dieter Hochreuter, *ISDN–TK–System integriert Telefax–, Teletex– und PC–Kommunikation*, ISDN–Anwendungen, NTZ Nachrichten Technische Zeitschrift 45 (1992) Mai, No. 5, Berlin, DE, pp. 340–347 (not translated).

P. Baggia, A. Ciaramella, D. Clementino, L. Fissore, E. Gerbino, E. Giachin, G. Micca, L. Nebbia, R. Pacifici, G. Pirano, and C. Rullent, *A man–made dialogue system for speech access to E–mail information using the telephone: implementation and first results*, CSELT Technical Reports, vol. XX, No. 1, Mar. 1992, pp. 79–83.

(List continued on next page.)

*Primary Examiner*—Chi H. Pham
*Assistant Examiner*—Frank Duong
*Attorney, Agent, or Firm*—Jenkens & Gilchrist, P.C.

[57] ABSTRACT

A system and method for facilitating the automatic or programmatic set up of calls and store-and-forward services by or under the direction of an IP in an Intelligent Network (IN) telecommunications system comprising several Intelligent Peripherals (IPs) connected to a Service Control Point (SCP) over a network. The various IPs are also linked with each other over a distinct telecommunications backbone. When a subscriber opens a dialogue with an IP to schedule an automatic call set up at a later time and date, the IP orders the SCP to set up a call at the desired time to the desired number by issuing a "Set Up Call" command. In response the SCP sets up the call to one or more subscriber(s) and confirms this to the initiating IP. The SCP then returns call set up results to the IP.

25 Claims, 6 Drawing Sheets

OTHER PUBLICATIONS

T. Yoshida, M. Sasaoka and M. Ohyama, *A Voice Store and Forward System Based on DSP Technique and Its Performance*, The New World of the Information Society, ICCC—1985, pp. 631–636.

E.S. P. Allard, N. Day, *Switching of Information Services in the UK Network and Evolution Towards the Intelligent Network,* International Switching Symposium, Stockholm, Sweden, May 27–Jun. 1, 1990, Session B2, Paper #1, vol. 1, pp. 119–122.

Judy E. Tschirgi, Praful B. Shanghavi and Earle H. West, *Speech Technology and Applications in the Intelligent Network*, IEEE 1992, pp. 0071–0075.

|      | SCEF | SMF | SDF | SCF | SSF | SRF | CCF |
|------|------|-----|-----|-----|-----|-----|-----|
| SCEP | X    |     |     |     |     |     |     |
| SMP  |      | X   |     |     |     |     |     |
| SDP  |      |     | X   |     |     |     |     |
| SCP  |      |     | (X) | X   |     |     |     |
| IP   |      |     |     |     |     | X   |     |
| SSP  |      |     |     |     | X   | (X) | X   |
| SSCP |      |     | (X) | X   | X   | (X) | X   |
| SN   |      |     | (X) | X   | X   | (X) | X   |
| NAP  |      |     |     |     |     |     | X   |

SYSTEM AND METHOD FOR IP-ACTIVATED CALL SETUP

CROSS REFERENCES TO RELATED APPLICATIONS

This U.S. patent application contains subject matter related to the following, U.S. patent applications: (1) SYSTEM AND METHOD FOR CONTROLLED MEDIA CONVERSION IN AN INTELLIGENT NETWORK, Ser. No. 08/724,845 (Attorney Docket No. 27946-00156), filed, Oct. 3, 1996, now U.S. Pat. No. 5,838,768 in the names of Bo Arne Valdemar ÅSTRÖM, Robert Johannes Bernardus SCHMERSEL, Gulamabbas SUMAR and Björn Arne SVENNESSON; (2) SYSTEM AND METHOD FOR SUBSCRIBER ACTIVITY SUPERVISION, Ser. No. 08/723,620 (Attorney Docket No. 27946-00157), filed, Oct. 3, 1996, in the names of Bo Arne Valdemar ÅSTRÖM, Robert Johannes Bernardus SCHMERSEL, Gulamabbas SUMAR and Björn Arne SVENNESSON; and (3) SYSTEM AND METHOD FOR INCOMING AND OUTGOING INTERROGATIONS FOR STORE-AND-FORWARD SERVICES, Ser. No. 08/724,769 (Attorney Docket No. 27946-00158), filed, Oct. 3, 1996, in the names of Bo Arne Valdemar ÅSTRÖM, Robert Johannes Bernardus SCHMERSEL, Gulamabbas SUMAR and Björn Arne SVENNESSON. These co-pending Patent Applications and any other domestic or foreign Patent Applications deriving therefrom and the disclosure(s) contained therein are all hereby incorporated by reference herein.

The present patent application and all the related co-pending patent applications identified above have been or will be assigned to Telefonaktiebolaget LM Ericsson (publ).

DESCRIPTION

1. Technical Field of the Invention

The invention relates to the provision of supplementary telecommunications services, and more particularly, to a system and method for facilitating the automatic or programmatic set up of calls and store-and-forward services by the control logic of a telecommunications system.

2. Description of Related Art

Customer demand for customized telecommunications services has been growing ever more rapidly. Special subscriber features such as Call Waiting, Call Forwarding, Abbreviated Dialing, etc., are becoming increasingly important to individual subscribers for the added convenience they provide, as well as to telecommunications service providers as sources of additional revenue. Such services are generally provided by special programming in the software of the central office exchange serving a particular subscriber. That is, the local exchange switch software is separately programmed to provide special service features to the subscribers connected thereto. Often both the hardware and the software of an exchange must be upgraded in order to enable the provision of special subscriber functionality.

When a call involves an interconnection between two parties connected to different exchanges, it is completed via a so-called transit or tandem exchange which forms part of the network interconnecting individual central office switches to one another. In such cases, the transit exchange is totally transparent to the two parties of the call and simply provides a voice path between the two end offices. Any special service features invoked by either party has traditionally been provided by the end office to which that subscriber is connected, independently of the network connection between the two parties.

In most telecommunications systems providing Plain Old Telephone Service (POTS), the communications link between a calling party (A-Party) and the called party (B-Party) is under the control of the A-Party. Consequently, the communications link between the A-Party and the B-Party remains in place until the A-Party's telephone instrument is placed "on-hook" in which case the system breaks the communications link and the end offices of both parties and in any transit exchange's which have been used to link the end offices together. If the B-Party were to place his or her telephone instrument on-hook, it has little effect until after a period of the order of several minutes when a timer triggers the disconnection of the circuits between the calling and the called parties. In newer types of telecommunications services, such as the Integrated Services Digital Network (ISDN), B-Party disconnect is employed but the mechanisms for implementing it are considerably different from those of conventional POTS networks.

Providing special subscriber services within conventional telecommunications exchanges requires an extensive upgrading of the software of each and every individual exchange which is to furnish such special services to its customers. Such upgrading of exchanges is often extremely expensive and virtually prohibitive from a cost-effectiveness standpoint with regard to the additional revenue provided by the additional subscriber services. This observation is even more true in small towns or rural areas where the demand for special subscriber services is relatively low and where existing exchanges have been in place for a considerable period of time and continue to serve adequately the basic telecommunications needs of a majority of the subscribers in that area.

The telecommunications business is facing increasing competitive pressures. The per-minute revenues of telecommunications operators everywhere has been steadily decreasing due to a number of factors. The deregulation of telecommunications services has increased the number of competitors in the business. Further, innovations like call-back services and calling cards permit users to arbitrage differences in bilateral calling rates between country pairs. Also, cable television companies have now started offering telephone services over their cable networks. Finally, innovative software has now made high-quality full-duplex calls over the Internet feasible.

Improvements in technology have also reduced the cost of providing basic telephone service. The telecommunications companies can no longer justify the relatively high tariffs levied on the provision of basic telephone services. Improvements in technology have lowered the actual cost of delivering a telephone call to virtually nothing. In economic terms, basic telephone services can be viewed as zero marginal cost business. The advances that have increased the power to price performance ratio of desktop computers over the years have also boosted the reliability and efficiency of modern telephone exchanges.

The same situation also pertains to interexchange connections. Due to the use of optical fibre, a substantial amount of capacity has been added to the telephone networks. Bandwidth no longer appears to be the scarce resource that it was just a few years ago, and, in fact has become a commodity that is frequently bought and sold in wholesale quantities.

Improvements in technology have also reduced or eliminated the effects of the geographic distance between a calling party and a called party as a significant factor in the cost of providing a telephone call. It has been argued that it cost no more in terms of network resources to call from Stockholm to Dallas (a distance of about 8,000 kilometers) than it does to call from Dallas to Austin (a distance of about 300 kilometers).

The explosive growth of the Internet has largely been due to the exploitation of the fact that its basic TCP/IP protocol permits e-mail messages to be sent and file transfers to be effected independent of the transmission distances involved.

In spite of the fact that the provision of long distance services does not cost much more than that of local basic telephone services, telecommunications operators continue to charge more for long distance telephone calls than for local calls. The increase in competition in the telecommunications industry is likely to make that situation increasingly unsustainable. Since long distance calls have traditionally been a significant source of the operating profits of the telecommunications companies, it has become increasingly obvious that the telecommunications companies need to find new sources of revenue.

One way in which telecommunications operators can increase revenues is by offering subscribers advanced services for which the subscribers would be willing to pay a premium for. As described earlier, in the network architectures of the past, the additional of new functionality to a network required that core exchange software be rewritten— an expensive and lengthy process that also carried the additional risk of introducing new bugs into the system. Furthermore, each exchange in the network has to be updated with the new software which further increased the cost of introducing new services. Telecommunications operators are no longer willing to tolerate such a state of affairs. There are great business opportunities for a telecommunications equipment manufacturer who can bring a product to the market first.

Telecommunications operators have expressed a need for faster and less expensive techniques for the introduction of new services into their telecommunications network. Further, they have desired that the impact of the new functionality be limited to one or a few exchanges only. It has also been found desirable for service-administration tasks such as the installation or modification of services, the addition of customer-specific data, etc., be capable of being handled from a central management facility.

It has also been desired that the design and implementation of the new services be done by the telecommunications operators rather than the equipment manufacturer. This would allow telecommunications operators to quickly react to perceived market needs and serve their customers more effectively and efficiently. It has also been found desirable to incorporate greater intelligence in the exchange software to permit various services to interact with subscribers. In this manner, the telephone instrument can become an advanced interface to the telecommunications network.

The Intelligent Network (IN) has been proposed as a solution to address the above requirements. The IN technology is designed to allow a telecommunications operator to design its own set of unique services or to adapt existing services to specific customer requirements. Further, the IN architecture permits the impact of installation of new services to be limited to a few control nodes.

Another design feature of the IN architecture is its centralized administration of services. This improves the response time and decreases the human resource overhead required to run the network. Furthermore, the IN architecture permits customer control of some customer-specific data.

For example, some telecommunications operators offer "personal number" services. The personal number service involves giving each subscriber a specific telephone number, usually one prefixed with an "area code" of 500. The design philosophy behind the personal number service is to supplant the plethora of contact numbers for each subscriber with just one phone number. Thus, when someone dials a subscriber's personal number, the exchange switch will query a central database and obtain a list of all of the telephone numbers where the subscriber might possibly be reached. The switch will then ring each of those numbers in a predetermined order until the call gets answered.

In one variant of this service, a subscriber may be provided the ability to dynamically update the contact number database from any telephone instrument. Such customer control can permit a subscriber to add the number of a hotel or other location where he or she may be temporarily located.

The design philosophy behind the IN architecture is to reduce the time to market for the provision of new services, to lower development and administration costs, and to enhance profits deriving from the provision of premium services. The classic example of an IN service is the use of a single dialed number (the B-number) by customers spanning a large geographic area that is redirected to one of a plurality of local service centers. Thus, a pizza franchise can advertise a single telephone number for ordering pizzas. Whenever a customer dials the advertised number, the IN service can direct the call to the nearest franchisee based upon the number of the dialing subscriber (the A-number).

A Brief History of IN

The Intelligent Network concept originated in the United States. Originally, the intent was to provide a central database for translating a single dialed number into a different terminating number. One of the earliest applications of IN services was to provide toll free calling ("Freephone").

Toll free numbers do not directly correspond to a physical telephone line, but need to be translated into an actual termination number. The translation may be dependent upon the location of the caller and upon the time of day.

A new signaling system called Signaling System No. 7 (SS7) was developed to allow high-speed communications between telephone exchanges before and during call setup. The SS7 protocol allowed for the first time, the fast database lookups needed for the implementation of toll-free calling. After the development of the SS7 technology, it became possible to exchange data across a telephone network virtually instantaneously. This was the genesis of the Intelligent Network.

The next step in the revolution of the IN was to move from static databases to dynamic ones that permitted customer control of customer-specific data. Additional interactivity came to be permitted when subscribers could control the progress of the call by keypad interaction from the subscriber's instrument. Such interactive IN is referred to in the U.S. as the Advanced Intelligent Network (AIN).

Present development and interest in the IN architecture is being driven by a few large-scale applications. Two such applications are the Universal Personal Number (UPN) Service and Virtual Private Network (VPN) Service. In the UPN service, a unique number is assigned to each individual rather than to a telephone instrument. The UPN number can be used to reach a subscriber irrespective of his or her location or type of network (whether fixed or mobile).

The VPN service allows a private network to be constructed using public network resources. Thus, a corporation could have a corporate telephone network that permits all of its employees to communicate with each other without investing in the hardware or software needed for providing a physical private network. By implementing a VPN service using the public network, a corporate customer can also avoid the costs of maintaining a physical network.

Inadequacies of Present IN Systems

The use of the Intelligent Network (IN) architecture has been advocated as a solution for speeding up the incorporation and roll out of new network capabilities and network services. However, the presently articulated standards for implementing IN concepts suffer from a number of shortcomings.

For example, many subscribers wish to automate the set up of a telephonic, audio-visual or data conference call by providing the telephone numbers of the parties to the conference and the date, time and duration of the conference to a telecommunications service provider. Traditionally, the scheduling and set up of conference calls has been done manually or in a semi-automatic manner. Parties to a scheduled conference have to be manually informed of the time of the call. Consequently, participants in a conference call have to be separately contacted one or more times prior to the call.

Furthermore, subscribers may wish to schedule a multiparty, multi-media conference call by notifying the IN system using a non-call-related store-and-forward message such as voice mail, electronic mail (e-mail), message in Short Message Service (SMS) format, pager messages, etc.

Service providers have found that subscribers would like to have greater predictability and speed for their conference call setups. Also, some scheduled participants might like to receive automatic advance notification of their participation in a previously scheduled conference call. Other subscribers might desire to have notifications to be translated or converted from one medium to another prior to delivery. Each subscriber may have a different preference about the format in which his or her incoming messages should be delivered in. Thus, for example, Subscriber A might like to receive an email notification every time he or she is scheduled to participate in a daytime conference call but would like a voice mail notification instead if she is out of town.

If a telecommunications service provider were able to store each subscriber's notification and delivery preferences, and perhaps even permit interactive scheduling and set up of conference calls, then the service provider would be able to provide enhanced value to the subscribers and thus reap additional revenues.

Thus, it would be highly desirable to be able to provide some means within an Intelligent Network system, to permit the IPs to direct the IN service controller to schedule and set up a call to one or more parties at a specified time. It would be even more useful if the conference call could be ordered or scheduled using a message sent in a non-call-related store-and-forward messaging scheme. This in turn requires a system and method for automatic call scheduling, set up and processing by the IPs in an IN system.

SUMMARY OF THE INVENTION

Therefore it is a primary object of the present invention to facilitate the automatic or programmatic set up of calls and store-and-forward services by the control logic of a telecommunications system. One embodiment of the present invention has been implemented in an IN (Intelligent Network) telecommunications system comprising a plurality of IPs (Intelligent Peripherals) connected to an SCP (Service Control Point) over a network. The plurality of IPs may be further connected to each other over a distinct telecommunications backbone.

It is another object of the present invention to enable an IP to initiate and control the set up of a call by the SCP on a message channel. It is also an object of the present invention to facilitate the automation of the call set up process and to permit a subscriber to transfer or forward calls, to schedule a conference call or to make broadcasts of voice- or data messages without manual intervention. Yet another object of the present invention is to permit a subscriber to interactively or in advance request or prescribe a call set up without necessitating a call dialogue. Such an arrangement will permit a subscriber to send a voice mail, a facsimile mail or an e-mail requesting a system callback to one or more identified or prespecified numbers at a specified time and/or for a specified duration.

In an embodiment of the present invention, an IP orders the SCP to set up a call to a subscriber by issuing a "Set Up Call" command to the SCP upon which the SCP sets up the call to one or more subscriber(s) and confirms the same to the IP as shown at 1002. The SCP then returns the results of the call set up to the IP.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein.

DESCRIPTION OF THE PREFERRED EMBODIMENT

The present invention provides a solution to a set of problems concerning the automatic set up of outgoing calls by the service controller in an IN system, in response to a directive from one or more IPs. The call set up request from an IP to the SCP in an IN system, may in turn arise from a change in the status of a servicing daemon in the IP. The extensions to the IN concept disclosed and described in this application can also be used in other telecommunications contexts and can also facilitate the provision of related supplementary subscriber services.

Intelligent Network (IN) Architecture

An Intelligent Network is a telecommunications network architecture that provides flexibility for facilitating the introduction of new capabilities and services into a network such as the Public Switched Telecommunications Network (PSTN) or a Public Land Mobile Network (PLMN). Examples of such new capabilities and services include toll free calling ("Free Phone"), credit card services and Virtual Private Networks (VPN).

IN embodies the dreams of the unbundled network of the future in which freedom is given to service providers and users to personalize the network services, independently of access, switch term technology and network providers. An international consensus view on IN is described in the ITU-TS Recommendation Q.1200.

Figure 1:
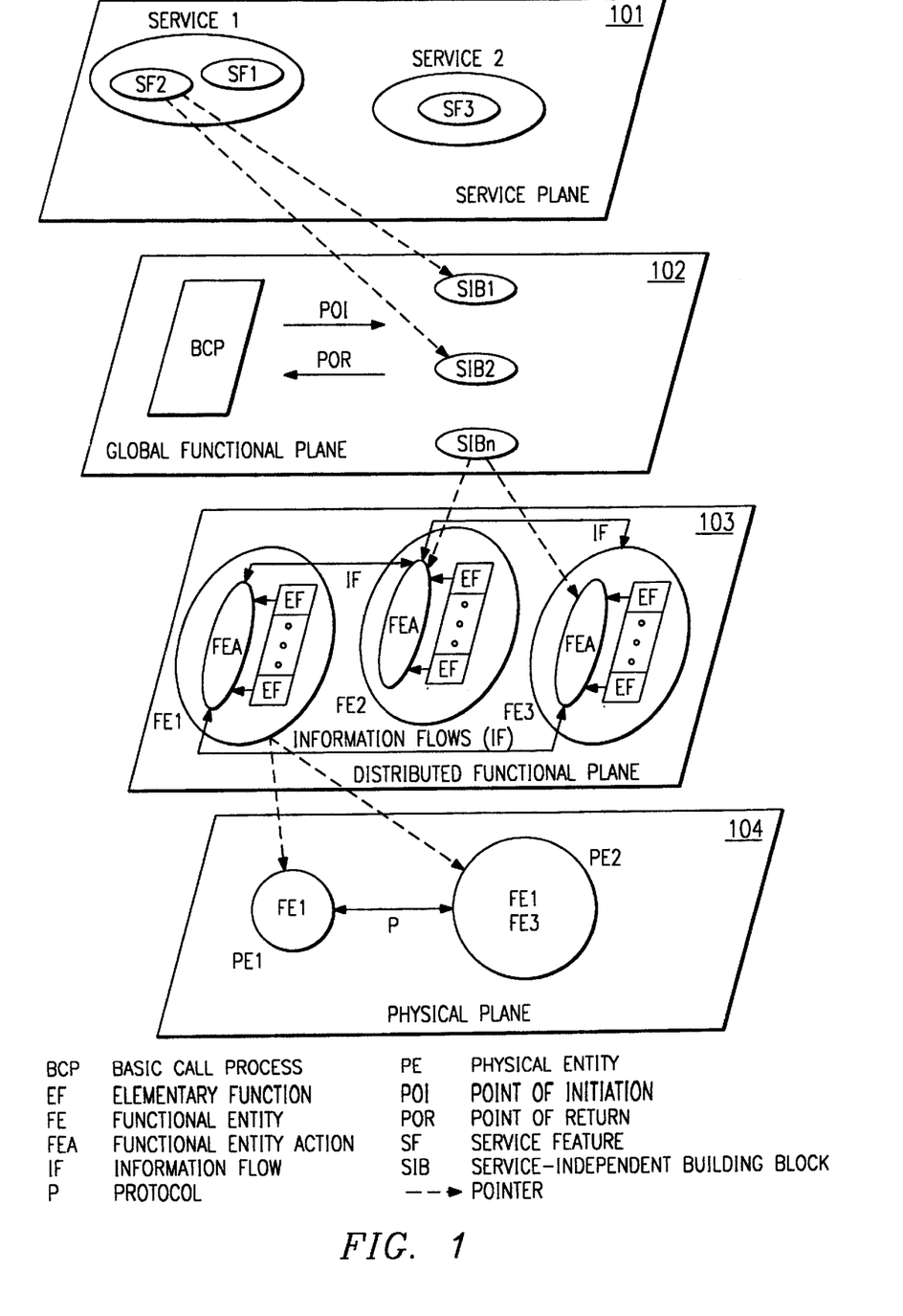
FIG. 1 is an illustrative diagram showing the standard Intelligent Network (IN) Conceptual Model.

The details of the IN architecture have been specified in the International Telecommunications Union (ITU) Recommendation I.312/Q.1201 which also contains a verbal explanation of the IN Conceptual Model (INCM) shown in FIG. 1. The ITU's IN Conceptual Model analyzes and systematizes the various tasks and processes associated with call handling and the provision of services into four planes: a Service Plane 101, a Global Function Plane 102, a Distributed Function Plane 103, and a Physical Plane 104.

So far, IN has been concentrated around a group of services referred to hereafter as Number Services, for example, toll free calling ("Free Phone"), credit card calling, personal number services, televoting, etc. A key characteristic of all these services is that they provide service to numbers that are unbundled from the access ports in the access nodes. Any node in the telecommunications network can be made a service node by the addition of a Service Switching Function (SSF) and/or Special Resource Function (SRF), both under control from a Service Control Function (SCF) via a service-independent protocol interface. The SCF is supported by a Service Data Function (SDF), which may be physically unbundled from the node.

The main building blocks of IN are the SSF, the SCF, the SDF and the SRF. The SRF is also referred to hereafter as the logical Intelligent Peripheral (logical IP). Each of these building blocks is a separate logical entity which may, but need not, be physically integrated with the other entities of the telephone network, logical or otherwise. The physical and logical entities are referred to interchangeably as one in the following description of the preferred embodiment.

The IN architecture divides the basic call process into discrete strictly-defined stages that gives telecommunications service providers and subscribers the ability to manipulate the call process. The components of a simple Intelligent Network 200 has been shown in FIG. 2. The standard architecture of the Intelligent Network has defined various components of the IN as well as the interfaces between the individual components.

When a call is made to an IN service, the call is first routed to a special node in the network that is called the Service Switching Point (SSP). If the SSP recognizes an incoming call as an IN call, then all further processing of the call is suspended while the SSP informs the Service Control Point (SCP), another node in the IN system, that an IN call has been received.

The SCP provides the "intelligence" in the "Intelligent Network." The SCP controls everything that happens to an IN call and makes all the call processing decisions. When the SCP decides upon the appropriate action that is to be performed on the call, the SCP instructs the SSP to carry out the necessary action.

The Service Control Function (SCF) contains the logic of an IN service and bears the complete responsibility for making decisions related to a call invoking that service. This service logic may run on any telecommunications platform (e.g., Ericsson's AXE platform or UNIX). The node (i.e., the physical hardware and the software) that contains the SCF is called the Service Control Point (SCP) 201.

Figure 2:
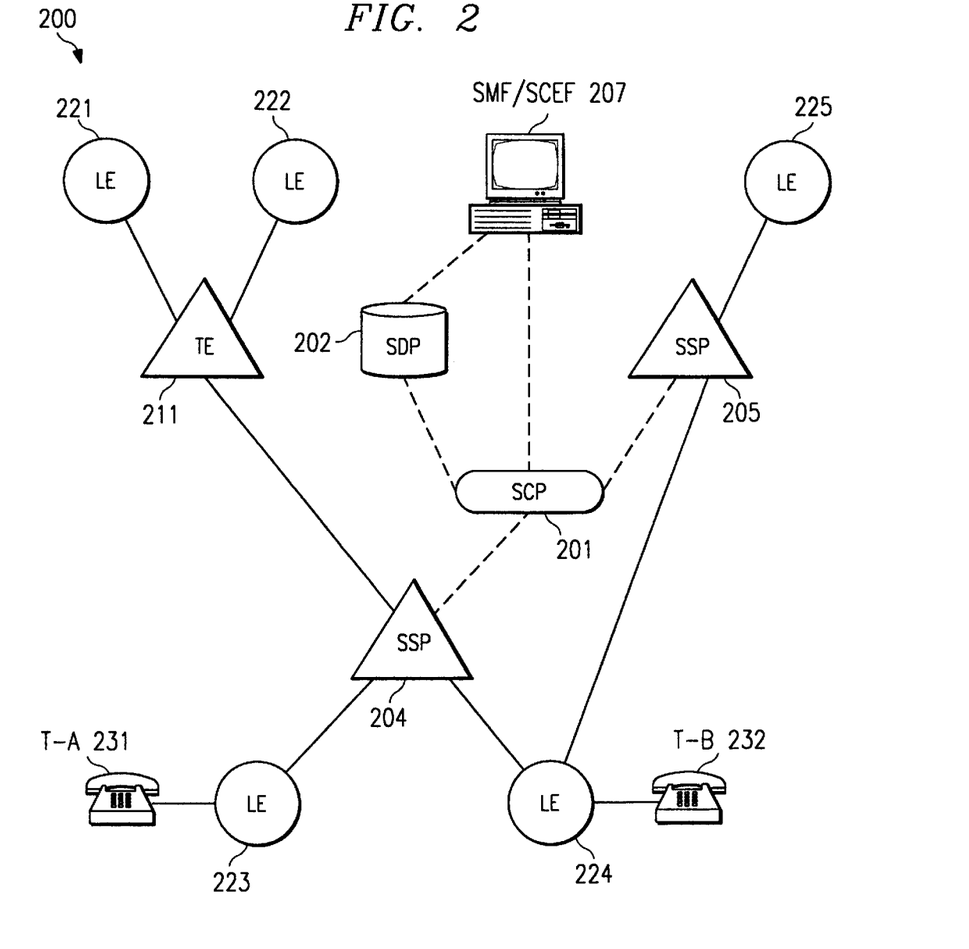
FIG. 2 shows the components of an exemplary simple Intelligent Network.

The data needed for each service (e.g., the list of subscriber telephone numbers) is provided by the Service Data Function (SDF). In one implementation of the IN architecture, the data needed for the services is stored in the SCF itself. Formally, the function of storing the service-related data is allocated to the SDF which provides the data upon demand to the SCF. In a typical IN implementation, the SDF can be UNIX's machine running a commercially-available database program such as Sybase. The physical node that contains the SDF is referred to as the Service Data Point (SDP) 202.

The normal call handling and supervisory functions of an exchange are performed by the Call Control Function (CCF). While the CCF is not formally part of the standard IN architecture, the CCF provides the IN with information about calls and also executes orders that have been received by the SSF.

The Service Switching Function (SSF) interprets the instructions sent by the SCF and passes the commands to be executed to the CCF. The SSF also receives call event data (e.g., the onhook/offhook status of a subscriber or a subscriber line being busy) from the CCF and passes the data to the SCF. The physical node (i.e., the exchange hardware and software) that contains the SSF is referred to as the Service Switching Point (SSP) 204 and 205.

The Specialized Resource Function (SRF) provides certain resources for use in IN services, e.g., DTMF (Dual Tone Multiple Frequency) digit reception, announcements and speech recognition. In the ITU IN recommendations, the SRF communicates directly with the SCF. In another implementation of the IN, the SRF functionality may be co-located with the SSF. In this case the SRF does not communicate directly with the SCF, but via the SSF. The SRF is not shown in FIG. 2.

The Service Management Function (SMF) 207 administers the maintenance of IN services, e.g., the addition or removal of data or the installation or the revision of services. The Service Creation Environment Function (SCEF) 207 allows an IN service to be developed, tested and input to the SMF. In one implementation of the IN, the SMF and the SCEF are combined into one and termed the Service Management Application System (SMAS). The SMAS application is part of the TMOS family and runs under the UNIX operating system. It permits services to be designed using a graphical interface and provides convenient forms for the entry of service data.

FIG. 2 shows an exemplary SCP 201 connected to an SDP 202 and SSPs 204 and 205. The SCP is also connected to an SMF/SCEF 207. All of the links running to and from the SCP 201 are shown as dashed lines in FIG. 2 to indicate that they are not voice links. The SDP 202 is also connected by a non-voice link to the SMF/SCEF 207. The SSP 204 is connected to two local exchanges (LEs) 223 and 224 as well as to a transit exchange (TE, 211. The transit exchange 211 in turn is connected to two other local exchanges 221 and 222. The SSP 205 is connected to local exchange 225. The local exchanges 223 and 224 are shown in FIG. 2 to be connected to an exemplary originating subscriber T-A 231 as well as to an exemplary terminating subscriber T-B 232.

If each of the logical building blocks of the IN are also physical entities, in the notation described earlier, the corresponding physical nodes are called the Service Switching Point (SSP), the Service Control Point (SCP), the Service Data Point (SDP), and the physical Intelligent Peripheral (IP). As stated earlier, in the discussion that follows, the term IP is used to generally refer to both a logical IP as well as a physical IP.

The user agent is identified in the SCF by the calling or the called party number, and invoked when an armed trigger point in the serving node is hit. Signaling data and call state data can be manipulated by the user agent. The SRFs are capable of in-band communication with the users or with each other to overcome limitations in the current signaling systems.

Current IN standards assume that the visited location and the home location of a subscriber are collocated but possibly unbundled from the access node and the service node. Although the separation of the access node and the service node functions reduces service introduction costs, it results in potentially unwanted interactions between access port services and number-based services. An enhancement of the access node to a service node is therefore required to provide flexibility in service design.

An alternative would be to add two remotely changeable personal telecommunications categories to the access nodes—one providing an unconditional hot-line connection to the service node for originating calls, and the other giving an unconditional call forwarding to the service node for terminating calls. It appears necessary in the longer term to separate the visited and home location functions as in cellular networks if costs are to be reduced and capacity is to be improved.

Figure 3:
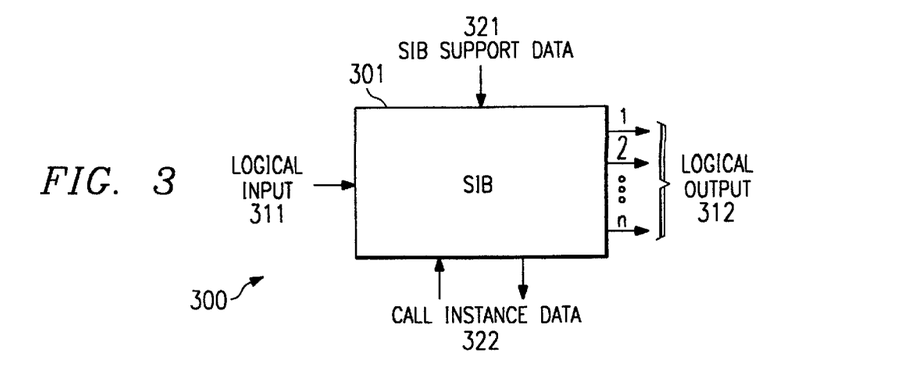
FIG. 3 shows the structure of a Service Independent Building Block (SIB)

One of the unique characteristic of IN is that services are implemented on the IN service platform based on its service independent building blocks (SIBs), and not directly in the network nodes. The SIBs are part of the SCP. FIG. 3 shows the structure o: a SIB. Each SIB 301 is an elementary logical element in a service logic that hides the implementation from the programmer. When existing SIBs cannot meet a new requirement, new SIBs are defined.

In IN products, the SIBs 301 perform functions such as analysis of signaling information, control of connection topology, interaction with the user, reading and writing of data, collection and output of call data, etc. Other SIBs are pure language elements such as jump, go to subroutine, loop, handover, etc. Each SIB 301 is available in the service platform. Service Logic Programs (SLPs) are built by SIBs 301 and refer to by their names. Service logic can be designed using a Service Creation Environment Function (SCEF). The SIBs 301 are made available to the SCEF through a system-independent Application Programming Interface (API). As also illustrated in the figure, the SIB receives a logical input 311, generates logical outputs 312, receives SIB support data 321 and receives, and outputs, call instance data 322.

Figure 4:
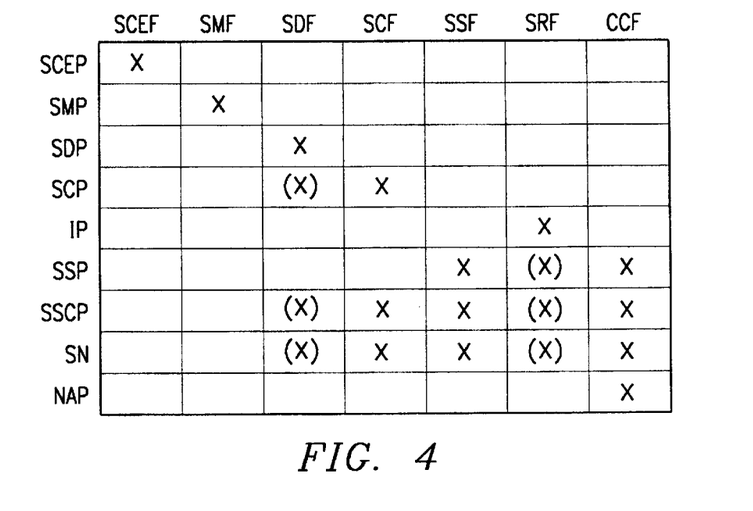
FIG. 4 shows the mapping of the various IN functional entities into physical units.

The mapping of the various IN functional entities into physical units or entities is shown in FIG. 4 where the suffix "F" stands for the various functional entities and the suffix "P" stands for physical entities. In FIG. 4, the acronym SMF refers to the Service Management Function and the acronym CCF refers to the Call Control Function.

Figure 5:
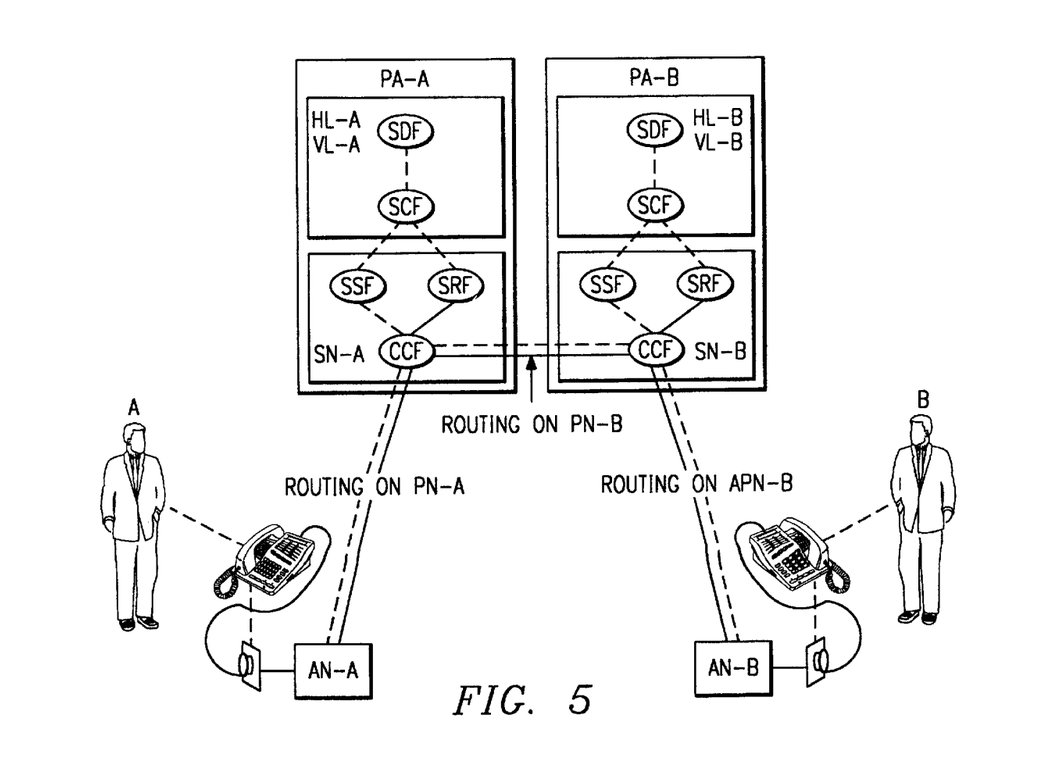
FIG. 5 shows an example of an IN implementation with service nodes at the transit level.

An example of an IN implementation with service nodes at the transit level is illustrated in FIG. 5. The service nodes shown in FIG. 5 can be reached from any access node such as a local switch in PSTN or ISDN or an MSC in a Public Land Mobile Network (PLMN) system. The service nodes can serve both personal telephony as well as other number-based services. User identities and authentication information may be transferred in-band to the SRF or embedded in calling- and called-party number fields in the signaling systems.

The personal agent has components in the Call Control Function, CCF (i.e., the trigger point data), the Service Control Function, SCF (i.e., the service logic), and in the Service Data Function, SDF (i.e., the service data). The IN platform components illustrated in FIG. 5 can be either integrated into the access nodes or implemented in separate service nodes.

The role of the Service Switching Function (SSF) is to recognize that a call is invoking an IN service, and then to communicate with the SCF to receive instructions about how to handle the call. The SCF is where the intelligence of the IN resides as it contains the logic required to execute various services. The SDF is a database system that provides the data storage capacity needed for the data intensive supplementary services. The IP is the network element that provides resources for user interaction such as voice announcements and dialogue, dual tone multi-frequency reception (DTMF) and voice recognition.

The IN Application Programming Interface (API)

Figure 6:
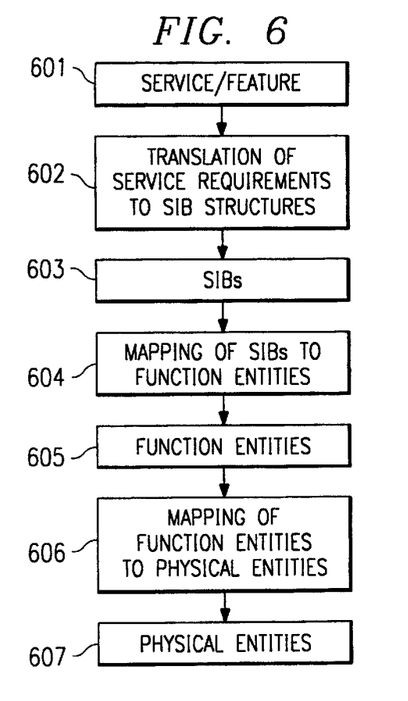
FIG. 6 shows the preferred methodology for implementing various services in the IN Conceptual Model.

The ITU's IN Conceptual Model shown in FIG. 1 also defines the methodology for implementing various services. This is shown in FIG. 6. In order to implement a service or feature 601, the service requirements are first translated to SIB structures at 602. The resulting SIBs 603 are mapped at 604 to various Functional Entities 605. The Functional Entities 605 in turn are mapped at 606 to one or more Physical Entities 607.

It should be noted that unlike the practice with all non-IN standards, the service requirements in IN are not directly translated into network functionality. Instead, the service requirements are translated into service platform elements (i.e., SIBs) which in turn are implemented according to the IN three-stage model to become reusable capabilities and protocol elements in the telecommunications network.

There are at least two possible approaches toward implementing the Application Program Interface (API) that conform to the ITU's IN Conceptual Model shown in FIG. 1. One approach would be to split the service logic into two parts: a fixed logic part and a flexible logic part. The SIBs are then linked to form decision graphs that are called as subroutines by the fixed logic. The fixed logic can be expressed in a standard programming language such as C or C++, etc., and compiled and loaded into a standard execution environment. The flexible logic part, in contrast, consists only of exchangeable data.

The second approach would be to define a service API that gives full control over all aspects of the logic by combining SIBs with each other to achieve the desired function. Each SIB can be linked to any other SIB in this approach. Some SIBs perform a telecommunications function while others are only linking elements in the logic. All logic is expressed as data that describes which SIBs are to be used, how they are linked, and what data each SIB is to use to perform its function. All implementation details are thus hidden from the service programmer. This is the principal approach taken in Ericsson's IN products.

Figure 7A:
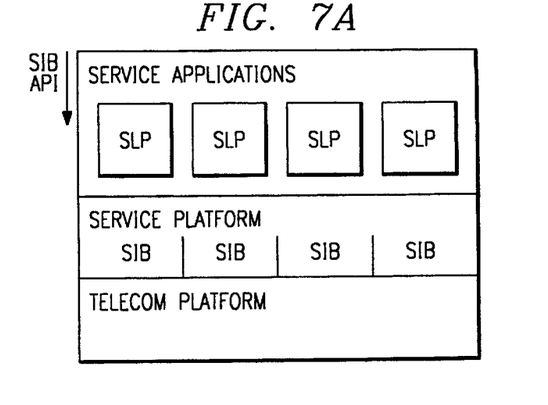
FIG. 7 illustrates two approaches towards implementing an API.
Figure 7B:
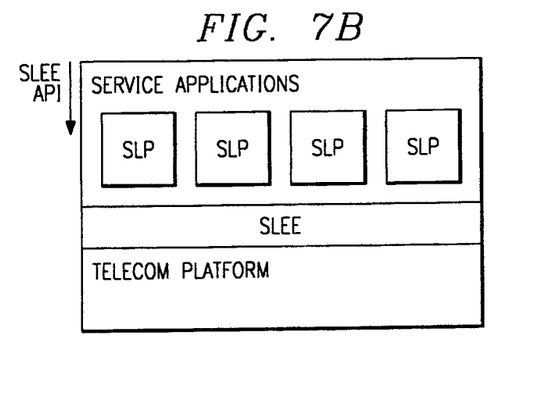

The two approaches toward implementing the API are illustrated in FIG. 7. The SIB-platform approach is shown in FIG. 7A, and the Service Logic Execution Environment (SLEE) approach is shown in FIG. 7B. The SIB approach of FIG. 7A expresses all service logic as a combination of elementary SIB functions that are available in the service platform to form flexible service profiles (FSPs). The SLEE approach shown in FIG. 7B considers the SIBs as subroutines to the fixed logic expressed in a programming language such as C, C++, Service Logic Programs (SLPs), etc. The compiled code uses telecommunications platform primitives, such as INAP (Intelligent Network Application Part) operations and database primitives.

Figure 8:
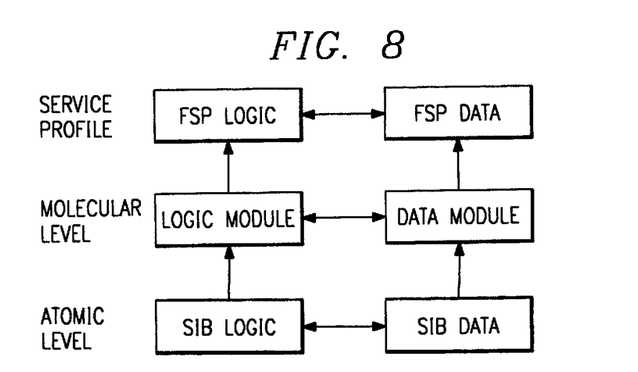
FIG. 8 shows one technique for defining personal agents using Service Logic Programs (SLPs)

When the same data representation is used for all logic and data, personal agents can be defined by means of Flexible Service Profiles (FSPs), as shown in FIG. 8. This arrangement offers a number of advantages, for example, permitting different logic elements to be loaded and activated without disrupting service, and in case of a fault in a personal agent, limiting the affected zone to only calls activating the faulty function.

Feature interaction has been a major obstacle in the development of IN systems. This problem arises from the fact that each feature is normally dependent on other features. There is a need to resolve such interactions, but no solution has yet been agreed on. It has been found in practice that existing feature implementations are often affected and many have to be redesigned or completely blocked when new features are introduced. It should be noted that this problem can be approached from two viewpoints: the network-centric view and the user-centric view of IN systems.

The traditional network-centric view sees IN as a complement to other technologies in adding supplementary services to an existing repertoire. Feature interaction has and continues to be the obstacle that prevents this view from being a realistic alternative. Each new supplementary service is composed of a fixed service logic part, and potentially of a flexible logic part. Personalization is thus limited to what can be achieved by combining a number of pre-defined supplementary services or features with each other. The addition of a new service may require long and costly development, not different from the pre-IN experiences in PSTN, PLMN and ISDN. The central issue in this viewpoint is not the design of a new feature, but on the task of integrating a new feature with other preexisting features.

In contrast, the user-centric view of IN focuses on the users rather than on the features. In principle, the needs of individual users are assumed to be unique, with the service provider being in full control of all service logic. The FSP approach is applied, and the result is that a range of unique service profiles can then be created by reusing SIBs rather than reusing features. This means that feature interaction ceases to be a problem, since no individual features are implemented. The interaction between the SIBs constitutes the service logic in this approach.

Interaction between service profiles in this approach is resolved through open signaling interfaces according to the half-call model. Before complete control can be provided from the step-wise developed IN platforms in an economically feasible way, it has been found necessary to use some of the existing supplementary services. It should be borne in mind that this is a shortcut that can result in interaction problems requiring enhancement of the IN platform in the future.

The principal goal in the user-centric view is to make the SIBs standardized so as to achieve both service-independence and system-independence and technology-independence. When this is achieved, a SIB-based service profile can be executed on any compatible platform, whether it is a switch processor, a stand-alone personal computer, or work-station. The old paradigm, giving the same features to all subscribers, is replaced by feature transparency for each individual subscriber, irrespective of access.

IN Signaling

The Intelligent Network Application Part (INAP) Protocol is used for signaling in IN systems. The INAP signaling protocol has been standardized by both the European Telecommunications Standards Institute (ETSI) and the International Telecommunications Union (ITU), and includes the CCITT Signaling System No. 7 (CCS7) which is one, but not the only network protocol that may be used to support INAP.

One of the shortcomings of the core INAP as it is specified today (i.e., the IN CS-1 standard), is that the communication possibilities between the SCF and the IPs are restricted to speech only. Other media such as e-mail, facsimile, data, etc. are currently not supported by the CS-1 standard. Thus, non-call-related services are not included in the present CS-1 standard.

The Networked IP (NIP) implementation, of which the present invention is a part, can be characterized as an extension to the INAP to include the handling and processing of non-voice media and the provision of non-call-related communication between the SCF and the IPs. NIP allows the SCF to be in total control of all store-and-forward (i.e. messaging) services such as voice mail, e-mail, SMS messages, etc. The protocol used for the NIP implementation is referred to hereafter as NIP-INAP. The NIP-INAP is an Ericsson-specific extension to the IN CS-1 standard.

Networked IPs

Figure 9:
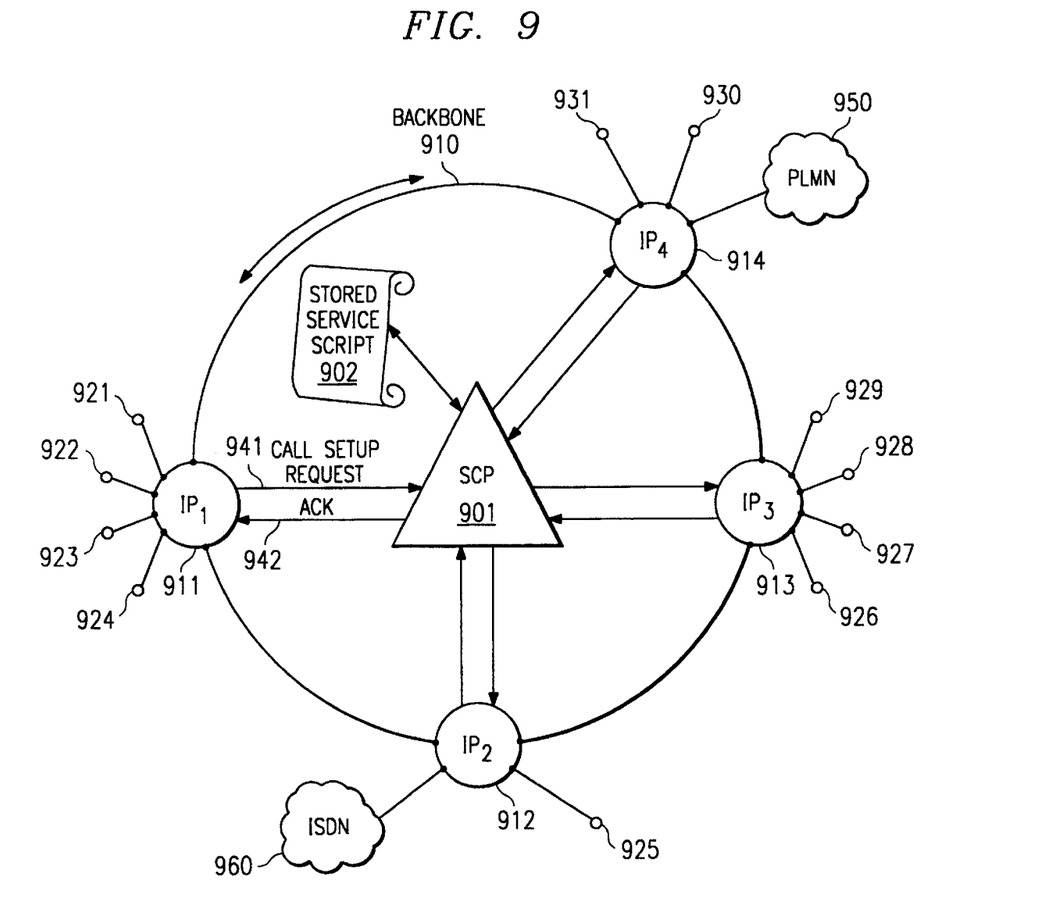
FIG. 9 shows one embodiment of the Networked IP (NIP) system and method of the present invention.

FIG. 9 shows a Networked IP (NIP) system of an embodiment of the present invention. A Networked IP system comprises an SCP 901 that can communicate with a plurality of Intelligent Peripherals (IPs) 911–914. Each of these logical IPs are SRFs in IN terminology, as noted earlier. For illustrative simplicity, only four IPs are shown in FIG. 9: an $IP_1$ 911, also referred to as the Call Initiation IP, connected to subscribers 921–924; an $IP_2$ 912 connected to subscriber 925 and also serving as a gateway IP to an ISDN system 960, an $IP_3$ 913, connected to subscribers 926–929, and an $IP_4$ 914 connected to subscribers 930 and 931 that also serves as a gateway to a PLMN system 950.

It should be emphasized that the functionally specialized IPs depicted in this illustration do not correspond to their physical implementations which may be different. The IPs 911–914 can communicate amongst each other over a communications backbone 910 using any protocol, for example, TCP/IP, X.25, etc.

The services, features and call restrictions that have been selected by or made applicable to each subscriber are stored in the SCP 901 in the form of a subscriber-specific Service Logic Program 902. The Service Logic Program 902 may include restrictions on incoming or outgoing calls, create virtual private networks and set access limitations concerning these VPNs for various call-related situations.

FIG. 9 also shows the Intelligent Network system connected through the gateway IPs, $IP_2$ 912 and $IP_4$ 914 to an exemplary Integrated Services Digital Network (ISDN) system 960 and a Public Land Mobile Network (PLMN) system 950, respectively. The IN system could also be connected to other public or private networks.

FIG. 9 also provides an overview of the operation of an embodiment of the present invention. When a subscriber such as the subscriber 921 or another IP sends a message to the Call Initiation IP, $IP_1$ 911, $IP_1$ issues a call set up request to the SCP 901, as shown by arrow 941. In response, the SCP 901 acknowledges the call set up request and returns the results of the automatic call set up to $IP_1$ 911 as shown at 942. Optionally, $IP_1$ may poll SCP 901 to check whether any IN services such as restriction control and number translation have been requested, selected or ordered by any of the parties to the call.

Presently, automated call set up by the system controller based on ancillary notification of called number, set up time and/or call duration, etc., by a subscriber in an ancillary medium such as voice mail, facsimile mail, e-mail, SMS messages, etc. is unable to be effectively provided. An embodiment of the present invention provides a networked solution based on the IN architecture by defining a protocol to implement unified mail solutions.

The present invention does this by introducing a new procedure to the INAP for this purpose: the "Set Up Call" command which enables an IP to direct the SCF to set up a call to a specific number at a specified time.

Extensions to INAP Procedures

We will next consider the detailed operation of the new procedure that has been introduced to the NIP-INAP for the implementation of an embodiment of the present invention. The new procedure enables an IP to order an SCP to set up a call or messaging channel.

Mailboxes can exist for several different media, for example, voice mail, facsimile mail, e-mail, SMS, etc. In the present disclosure, each medium and its associated mailbox, is referred to as a logical IP.

Figure 10:
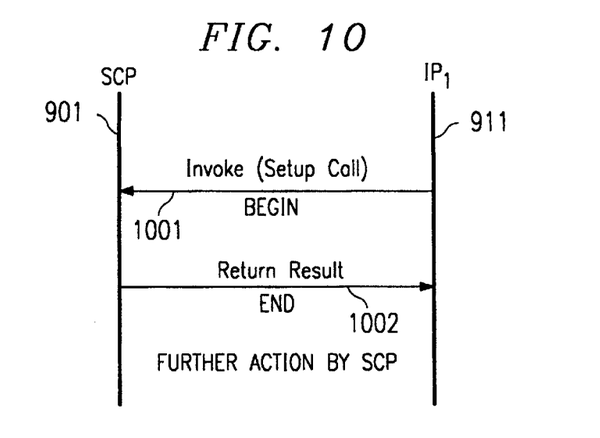
FIG. 10 is an overview sequence diagram illustrating the flow of messages between the SCP and the various IPs during the operation of the "Set Up Call" command of the present invention.

In the sequence diagram presented below, a specific IP referred to as the Call Initiating IP, $IP_1$ 911 directs the SCP to set up a call. However, it should be emphasized that the actual call set up request can also originate at any IP containing the necessary processing power and system resources for interpreting a call set up request received in a non-call-related medium e.g. voice mail, e-mail, SMS messages, etc.

The communications between the SCP and the various IPs 911–914 is shown using Transaction Capabilities Application Part (TCAP) notation in FIG. 10, with the message type being shown below the arrow and the components of the TCAP message and the parameters being shown above each arrow.

The "Set Up Call" Command

FIG. 10 shows the sequence diagram when an IP 911 orders the SCP 901 to set up a call to a subscriber. This phase begins as shown at 1001 with the $IP_1$ 911 issuing a "Set Up Call" command to the SCP 901 upon which the SCP sets up the call to one or more subscriber(s) and confirms the same to the $IP_1$ 911 as shown at 1002. The process ends with the SCP returning the results of the call set up to $IP_1$ as shown at 1002.

The above-described system and method enables an IP to initiate and control the set up of a call on a message channel by the SCP. This makes it possible to automate the call set up process and permits a subscriber, to schedule a conference call or to make broadcasts of voice- or data messages without manual intervention. An additional advantage of provided by an embodiment of the present invention is that when used in conjunction with the media conversion technique and system that is described in the above-referenced, co-pending patent application entitled SYSTEM AND METHOD FOR CONTROLLED MEDIA CONVERSION IN AN INTELLIGENT NETWORK, Ser. No. 08/724,892 (Attorney Docket No. 27946-00156), in the names of Bo Arne Valdemar ÅSTRÖM, Robert Johannes Bernardus SCHMERSEL, Gulamabbas SUMAR and Björn Arne SVENNESSON that is hereby incorporated by reference herein, a subscriber is permitted to interactively or in advance request or prescribe a call set up in the absence of a call dialogue, i.e., it can permit a subscriber to send a voice mail, a facsimile mail or an e-mail requesting a system callback to one or more identified or prespecified numbers at a specified time or for a specified duration.

SCP and IP Finite State Machines

Figure 11:
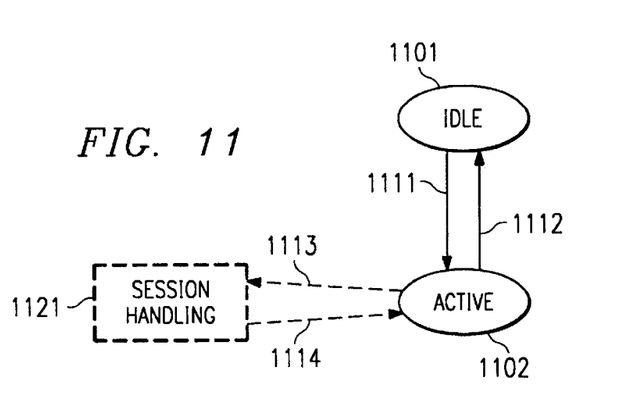
FIG. 11 shows the finite state machine for the SCP during the operation of the present invention.
Figure 12:
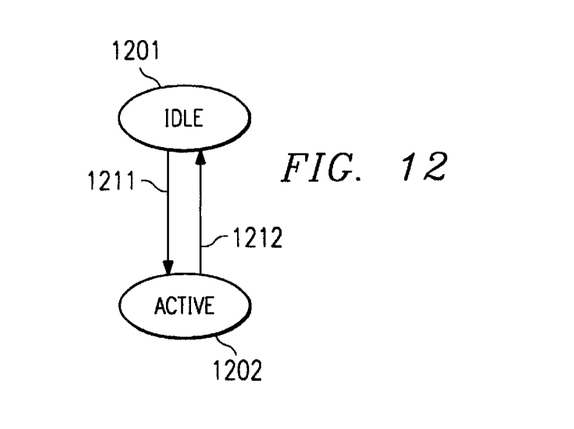
FIG. 12 shows the finite state machine for the IP during the operation of the present invention.

FIGS. 11 and 12 show the finite state machines for the SCP 901 and the various IPs 911–914 of the present invention. In FIGS. 11 and 12, the states of the machine are symbolized with an oval, while events causing state transitions are drawn as continuous arrows. Functions are depicted within broken rectangles, while actions ordered by the functions are indicated by broken arrows FIG. 11 shows the finite state machine for the SCP. As can be seen, the SCP has two states: the Idle state 1101, and the Active state 1102. The SCP also has an additional quasi-state: the Session Handling state 1121.

The SCP goes from the Idle state 1101 to the Active state 1102 upon the receipt of the "Set Up Call" command from $IP_1$ 911, as shown at 1111. The SCP goes from the Active state 1102 to the Idle state 1101 as shown at 1112 upon normal termination of the dialogue between the SCP and the invoking IP, upon rejection of a dialogue due to the presence of improper components and upon a dialogue being aborted from either side.

Upon the invocation of the "Set Up Call" command by $IP_1$ 911, the transition from the Idle state 1101 to the Active state 1102 is additionally accompanied by initiation of the call set up by the SCP as shown at 1113 and the subsequent return of the results of the call set up attempt as shown at 1114.

FIG. 12 shows the finite state machine from the IP side. The IPs 911–914 have two principal states: the Idle state 1201 and the Active state 1202.

As shown in FIG. 12, an IP goes from the Idle state 1201 to the Active state 1202 upon invoking the "Set Up Call" command as shown at 1211. The reverse state transition, from the Active state 1202 to the Idle state 1201 as shown at 1212 occurs upon normal termination of the dialogue with the SCP 901, upon rejection of an offered result by the SCP due to the presence of improper components, upon an abort of the SCP-IP dialogue from either side or upon the operation being timed out.

As mentioned previously, conventionally, when a multi-party conference call is to be made, the caller must manually call each party and join each party into the teleconference to form the conference call. Typically, the caller utilizes a predefined keypad for a particular PBX or exchange. Sometimes, instead, the parties desiring to participate in the teleconference sequentially call in to one caller, the teleconference leader. And, the teleconference leader manually hooks the incoming party into the conference call.

Operation of an embodiment of the present invention permits automation of the call set-up. A subscriber subscribes to a service permitting automated teleconference, or other call setup, services by proper instruction of the IPs, such as the $IP_1$ 911 (shown in FIG. 9). In one embodiment, a subscriber initiates the automated teleconference by utilizing a non-call related, store-and-forward message, such as an E-mail message sent to an IP. Utilization of such a message permits advance call setup. The E-mail message sent to the IP in such an embodiment includes the time, date, at which the teleconference is desired and the parties to the teleconference. The IP schedules the task to be performed and triggers the call setup at the appropriate time and date. That is to say, the IP informs the SCP, such as the SCP 901 (shown in FIG. 9), to set-up a call to the destinations, i.e., parties requested in the E-mail utilizing the CALL SETUP procedures described previously.

In other embodiments, the subscriber can initiate the teleconference in other manners, such as by utilizing an SMS message or by utilizing other terminals to instruct the IP to initiate the call set-up.

In yet other embodiments, analogous procedures are utilized for deferred, call set-ups such as for call wake-up services, dial-out notification services, or the like.

Although a preferred embodiment of the method and apparatus of the present invention has been illustrated in the accompanying drawings and described in the foregoing detailed description, it is to be understood that the invention is not limited to the embodiments disclosed, but is capable of numerous rearrangements, modifications and substitutions without departing from the spirit of the invention as set forth and defined by the following claims.

What is claimed is:

1. In an IN (Intelligent Network) telecommunications system comprising a plurality of IPs (Intelligent Peripherals) connected to an SCP (Service Control Point) over a network, said plurality of IPs being optionally connected to each other over a telecommunications backbone, a method for facilitating the automatic or programmatic set up of calls and store-and-forward services, said method comprising the steps of:

a subscriber specifying call set up parameters to an IP that is to initiate the call set up, including the subscriber specifying said parameters without prompting from the IN telecommunications system;

transmitting a SET UP CALL command from the initiating IP to the SCP when the call set up parameters are satisfied;

in response to the SET UP CALL command, the SCP setting up a call involving two or more parties without manual intervention; and transmitting a call set up confirmation message from the SCP to the initiating IP.

2. The method of claim 1 for facilitating the automatic or programmatic set up of calls wherein said call set up parameters include the date, the time and the telephone numbers of the parties to be connected by a teleconference link or a message broadcast channel.

3. The method of claim 1 for facilitating the automatic or programmatic set up of calls wherein the call set up parameters additionally include the desired or anticipated duration of the call.

4. The method of claim 1 for facilitating the automatic or programmatic set up of calls wherein said call set up parameters are received from a remote location.

5. The method of claim 1 for facilitating the automatic or programmatic set up of calls wherein said call set up parameters are received in a different medium than the native data input medium of a telecommunications system.

6. The method of claim 5, wherein the different medium is selected from the group of: email, the Internet, facsimile, voice mail, and an SMS message.

7. The method of claim 1, wherein the specifying step includes the subscriber sending a store-and-forward message which includes the call set-up parameters.

8. In an IN (Intelligent Network) telecommunications system comprising a plurality of IPs (Intelligent Peripherals) connected to an SCP (Service Control Point) over a network, said plurality of IPs being optionally connected to each other over a telecommunications backbone, a system for facilitating the automatic or programmatic set up of calls and store-and-forward services, said system comprising:

means for permitting a subscriber to, without prompting from the IN telecommunications system, specify call set up parameters to an IP that is to initiate a call set up;

means for transmitting a SET UP CALL command from the initiating IP to the SCP when the call set up parameters are satisfied;

the SCP responsive to the SET UP CALL command for setting up a call involving two or more parties without manual intervention; and means for transmitting a call set up confirmation message from the SCP to the initiating IP.

9. The system of claim 8 for facilitating the automatic or programmatic set up of calls wherein said call set up parameters include the date, the time and the telephone numbers of the parties to be connected by a teleconference link or a message broadcast channel.

10. The system of claim 8 for facilitating the automatic or programmatic set up of calls wherein the call set up parameters additionally include the desired or anticipated duration of the call.

11. The system of claim 8 for facilitating the automatic or programmatic set up of calls wherein said call set up parameters are received from a remote location.

12. The system of claim 8 for facilitating the automatic or programmatic set up of calls wherein said call set up parameters are received in a different medium than the native data input medium of a telecommunications system.

13. The system of claim 12, wherein the different medium is selected from the group of: email, the Internet, facsimile, voice mail, and an SMS message.

14. The system of claim 8, wherein the means for permitting includes a means for permitting the subscriber to send a store-and-forward message which includes the call set-up parameters.

15. In a method for providing communication services by way of an IN (Intelligent Network) telecommunications system, an improvement of a method for programmatically setting up the services by way of the IN telecommunications system, said method comprising the steps of:

a subscriber sending a request for a communication service to be set-up at a selected time, including the subscriber sending the request without prompting from the IN telecommunications system;

detecting the request at an IP (Intelligent Peripheral), and the IP scheduling the communication service to be provided at the selected time;

forwarding from the IP to an SCP (Service Control Point) an indication of the request, said forwarding step scheduled by the IP based on the selected time; and the SCP implementing the communication service in response to the indication.

16. The method of claim 15 wherein the request detected during said step of detecting comprises a store-and-forward message.

17. The method of claim 15 wherein said step of forwarding comprises transmitting a call setup request to the SCP.

18. The method of claim 15 wherein said step of forwarding further comprises polling the SCP to determine whether an IN service related to at least the subscriber is stored at the SCP.

19. The method of claim 15 wherein the communication service comprises a conference call and wherein said step of scheduling comprises scheduling the conference call.

20. The method of claim 15, wherein said sending step includes the subscriber sending a store-and-forward message which indicates the selected time.

21. In an IN (Intelligent Network) telecommunications system, an improvement of apparatus for programmatically setting up a communication service by way of the IN telecommunications system, said apparatus comprising:

an IP (Intelligent Peripheral) coupled to receive from a subscriber a request that has been sent by the subscriber without prompting from the IN telecommunications system, wherein said request is for the communication service to be set up at a selected time and said IP is operable for scheduling the communication service to be provided at the selected time; and an SCP coupled to said IP to receive therefrom an indication of the request for the communication service, said indication scheduled by said IP in response to said selected time, said SCP responsive to said indication for implementing the communication service.

22. The apparatus of claim 21 wherein said IP generates a call setup request responsive to reception thereat of the request, and wherein the indication of the request to which said SCP is coupled to receive comprises the call setup request.

23. The apparatus of claim 21 wherein the request for a communication service comprises a request for a conference call between a plurality of subscribers, and wherein said SCP is further for implementing the conference call at the selected time.

24. The apparatus of claim 21 wherein the request received by said IP comprises a store-and-forward message.

25. The apparatus of claim 21 wherein the communication service comprises a deferred communication service and wherein said SCP is further for implementing the deferred communication.

* * * * *

UNITED STATES PATENT AND TRADEMARK OFFICE
CERTIFICATE OF CORRECTION

PATENT NO. : 6,005,845
DATED : December 21, 1999
INVENTOR(S) : Svennesson et al.

It is certified that error appears in the above-identified patent and that said Letters Patent is hereby corrected as shown below:

| | |
|---|---|
| Column 5, line 24 | Replace "multiparty" With --multi-party-- |
| Column 5, line 38 | Replace "email" With --e-mail-- |
| Column 8, line 60 | Replace "(TE," With --(TE)-- |
| Column 9, line 36 | Replace "o: a SIB" With --of a SIB-- |
| Column 11, line 20 | Replace "cr completely" With --or completely-- |
| Column 15, line 10 | Replace "embodiments" With --embodiment(s)-- |

Signed and Sealed this

Twenty-second Day of May, 2001

Attest:

NICHOLAS P. GODICI

Attesting Officer     *Acting Director of the United States Patent and Trademark Office*